(12) United States Patent
Amon

(10) Patent No.: US 7,408,159 B1
(45) Date of Patent: Aug. 5, 2008

(54) DUAL INFRARED BAND OBJECTIVE LENS

(75) Inventor: Max Amon, Maitland, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1536 days.

(21) Appl. No.: 09/116,809

(22) Filed: Aug. 7, 1998

Related U.S. Application Data

(63) Continuation of application No. 08/310,108, filed on Sep. 22, 1994, now Pat. No. 6,423,969.

(51) Int. Cl.
*G08B 13/14* (2006.01)
(52) U.S. Cl. .................................. 250/339.01; 359/356
(58) Field of Classification Search ................. 250/216, 250/339.01; 359/356
See application file for complete search history.

(56) References Cited

U.S. PATENT DOCUMENTS

| | | | |
|---|---|---|---|
| 4,486,069 A | 12/1984 | Neil et al. | |
| 4,537,464 A | 8/1985 | Boutellier | |
| 4,586,069 A | 4/1986 | Koniger et al. | |
| 4,621,888 A | 11/1986 | Crossland et al. | |
| 4,714,307 A | 12/1987 | Palmer | |
| 4,871,219 A | 10/1989 | Cooper | |
| 4,903,101 A | 2/1990 | Maserjian | |
| 4,921,318 A | 5/1990 | Szumski | |
| 4,975,567 A | 12/1990 | Bishop et al. | |
| 4,989,962 A | 2/1991 | Kebo | |
| 4,999,005 A | 3/1991 | Cooper | |
| 5,198,659 A | 3/1993 | Smith et al. | |

OTHER PUBLICATIONS

T.H. Jamieson, "Ultrawide waveband optics," *Optical Engineering*, Mar./Apr. 1984, vol. 23, No. 2, pp. 111-116.
M.O. Lidwell, "Achromatism of lenses for thermal IR," *Proceedings SPIE*, vol. 518, 1984, pp. 73-80.
M. Roberts et al., "Wide waveband infrared optics," *Proceedings SPIE*, vol. 1013, 1988, pp. 84-91.

*Primary Examiner*—Mark Hellner
(74) *Attorney, Agent, or Firm*—Buchanan Ingersoll & Rooney PC

(57) ABSTRACT

An infrared refractive lens triplet having color correction properties for radiation within the 3 to 12 micrometer spectral band for use with a quantum well detector for simultaneous dual band imagery. In certain embodiments of the invention, two widely spaced triplets form a Petzval-type objective lens. Each lens triplet is made up of a negative zinc sulfide lens, a positive zinc selenide lens, and a negative gallium arsenide lens coaxially positioned along a chief ray of the lens system.

16 Claims, 3 Drawing Sheets

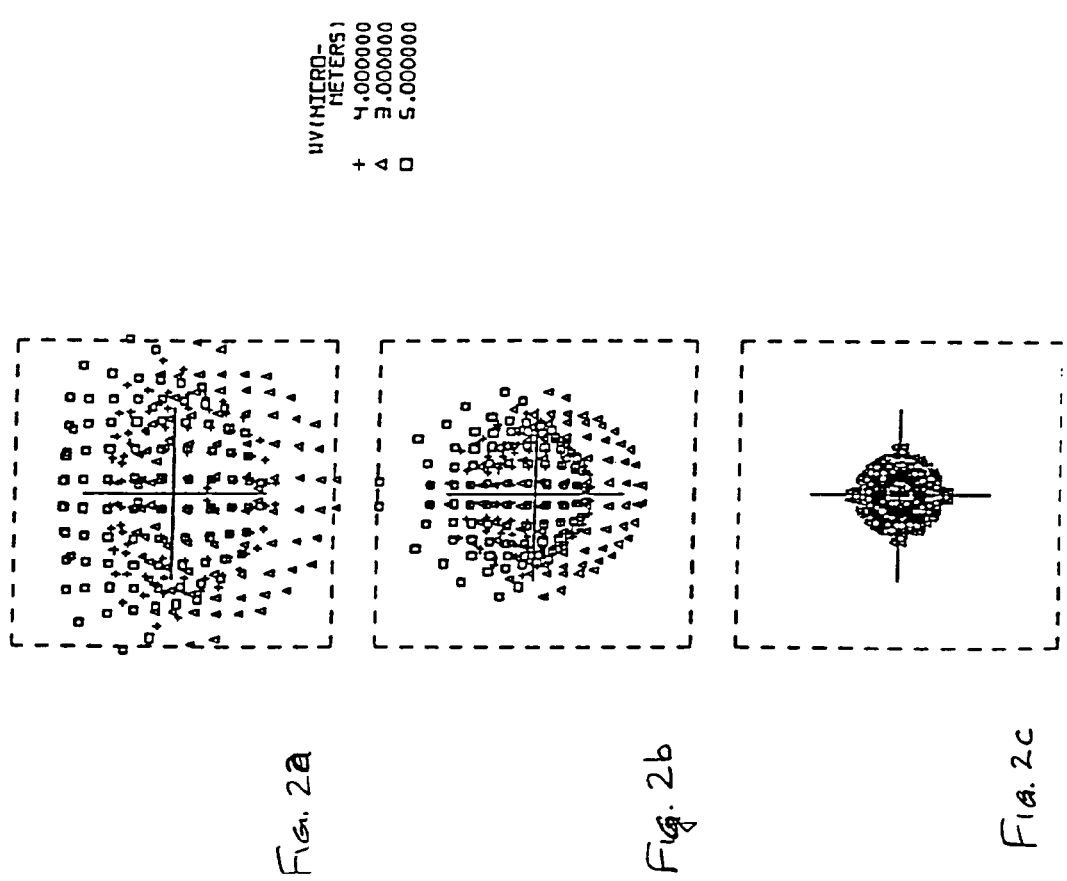

DUAL INFRARED BAND OBJECTIVE LENS

This application is a continuation of Ser. No. 08/310,108 filed Sep. 22, 1994 now U.S. Pat. No. 6,423,969.

BACKGROUND

1) Field of the Invention

The present invention relates to an objective lens system and, in particular, a Petzval objective, capable of simultaneous dual band imagery in both the 3-5 and 8-12 micrometer spectral ranges, for use with a dual spectral band detector, such as a quantum well detector.

2) Discussion of Related Art

Recent advancements in quantum well detector technologies permit the simultaneous processing and display of dual infrared band imagery with a single detector at a single focal plane. There are advantages of imaging each spectral band and the possibility of focusing both bands simultaneously may yield greater information for surveillance and/or target discrimination by imaging devices.

Imaging devices, search and track sensors such as forward looking infrared systems, and other types of optical devices which operate in the 3-12 micrometer spectral region use either reflective or refractive objective lens systems. An advantage of reflective optics is that they operate within a wide spectral band. However, reflective optics systems have several undesirable features, such as, for example, a more limited field of view and a large physical size. In addition, central obstructions in reflective optics limit the modulation transfer function (MTF), or sine wave response.

Additionally, efficient cold shielding is important with any cooled detector array. Reflective optics are not appropriate for wide field of view applications, particularly when efficient cold shielding is necessary.

In the past, refractive lens systems have been designed for limited ranges, e.g., either the 3-5 or the 8-12 micrometer bands. This is because the refractive indices of the component lens materials vary significantly between the two spectral bands. For example, germanium behaves like a crown (a low dispersion material) in the 8-12 micrometer wavelengths and like a flint (a high dispersion material) in the 3-5 micrometer region. Systems designed to operate in one band exhibit intolerable chromatic aberrations in the other band. The design for either long wave (8-12 micrometers) or short wave (3-5 micrometers) lenses are commonplace, but the need for simultaneous dual band operation is a relatively new requirement.

The number of optical materials that can transmit wavelengths in the spectral range of interest for this application is limited, and many infrared lens materials are soft or water soluble, which make them unsuitable for tactical systems.

Several studies have been carried out to isolate optical material combinations that yield refractive lens designs that are color corrected over the entire 3-12 micron spectral region. The following publications describe such studies: Thomas H. Jamieson, "Ultrawide Waveband Optics", *Optical Engineering*, Vol. 23, No. 2, April 1984, pages 111-116; M. O. Lidwell, "Achromatism of Lenses for Thermal IR", *Proceedings SPIE*, Vol. 518, 1984, pages 73-80; and, M. Roberts and P. Rogers, "Wide Waveband Infrared Optics", *Proceedings SPIE*, Vol. 1013, 1988, pages 84-91.

These publications describe optical design studies that employ many different infrared lens material combinations. The solutions described in these studies yield excellent color correction over the spectral range of 3-12 microns, but the material combinations are poor choices from the standpoint of durability, manufacturability and reliability.

SUMMARY

The present invention overcomes the problems of the prior art by providing a combination of lens materials that yield excellent broad band color correction in the 3-12 micron spectral range; that are durable, easily produced and highly reliable; and therefore that are suitable for tactical infrared imaging systems.

Specifically, the present invention is an optical lens system made up of at least one lens triplet of a negative zinc sulfide lens, a positive zinc selenide lens, and a negative gallium arsenide lens, each of the lenses being positioned along a chief ray for simultaneous dual band imagery in both the 3-5 and 8-12 micrometer spectral bands. Alternatively, the lens system can include two widely spaced, net positive triplets, forming a Petzval-type lens. A quantum well detector may be placed at the focal plane for dual band image detection.

BRIEF DESCRIPTION OF THE DRAWINGS

The invention may be best understood by reference to the following detailed description when read in conjunction with the following drawings, wherein:

FIGS. 2a-2c are spot diagrams illustrating the performance achieved in the spectral band of 3-5 micrometers.

DETAILED DESCRIPTION

Figure 1:
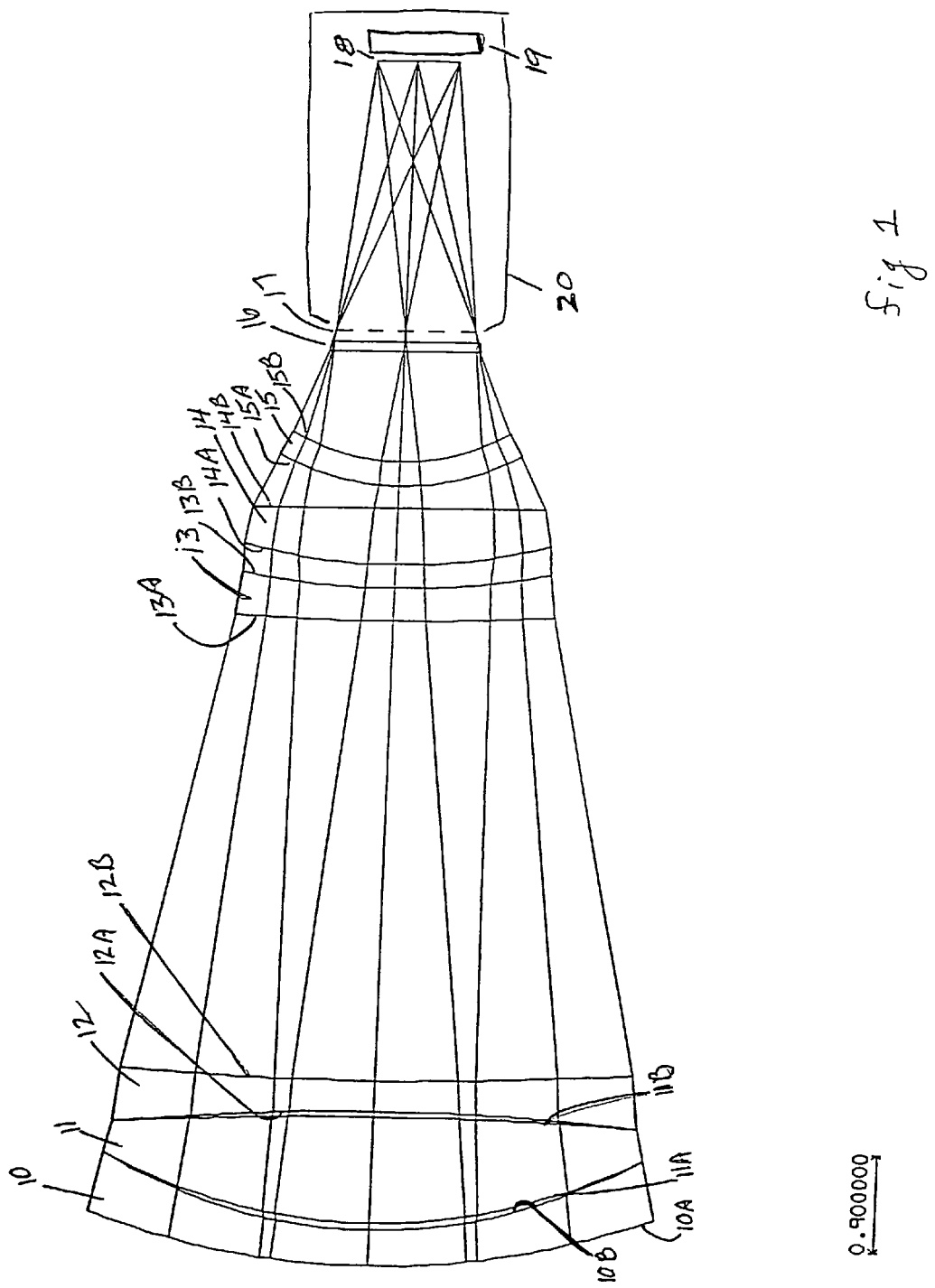
FIG. 1 illustrates a YZ profile of a wide band Petzval objective lens employing two widely spaced triplets in accordance with the present invention.
Figures 3A, 3B, 3C:
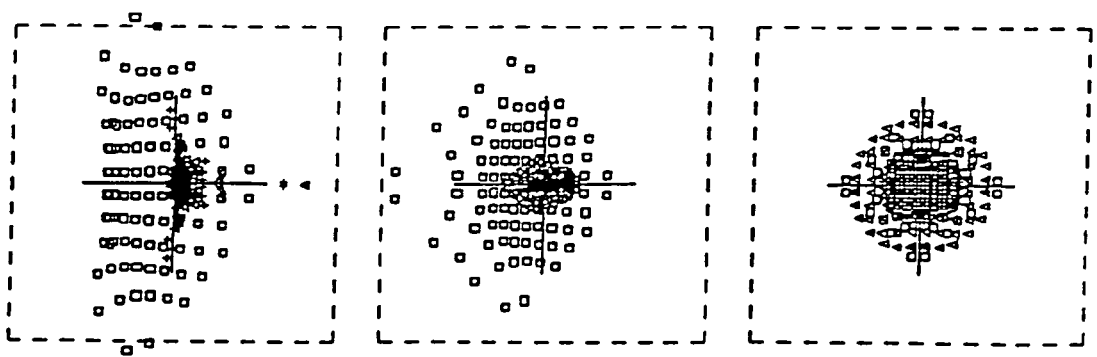
FIGS. 3a-3c are spot diagrams illustrating the performance achieved in the spectral band of 8-12 micrometers.

The index of refraction of optical materials varies with wavelength. The refractive index is generally higher at shorter wavelengths so that light converges faster (the focal length is shorter) than at longer wavelengths. This spread in the focal position over a spectral range is the primary chromatic aberration called axial color. It is relatively easy to correct the axial color aberration in either the 3-5 or the 8-12 micrometer spectral range by simply combining low and high dispersion elements and dividing the magnification power of the lens system among positive and negative lens elements. Color correction of both bands is much more difficult.

The present inventor has discovered a unique combination of lens powers, including an aspheric surface, and materials that yield color correction for both spectral bands simultaneously. The type of lens and the materials are, in order of their appearance along a chief ray of a focal optical lens system, as follows:

| Lens | Material |
| --- | --- |
| Negative | Zinc sulfide (ZnS) |
| Positive | Zinc selenide (ZnSe) |
| Negative | Gallium arsenide (GaAs) |

Recent advances in the quantum well detectors, or any present or future detectors capable of dual spectral band imagery, give rise to a need for dual band optics such as disclosed herein so that such detectors can be utilized to their best efficiency.

An exemplary set of lens characteristics for a conventional quantum well detector is as follows:

| Effective Focal Length (EFL) | 7.5" |
|---|---|
| f/# | 2.0 |
| Field of View | 4.0 × 4.0 degrees |
| Pixel Size | 0.002" |
| Format Size | 0.5 × 0.5 |
| Spectral Range | 3 to 5 μm and 8 to 12 μm |
| Cold Shield Efficiency | 100% |

To achieve the above characteristics, the simple lens triplet, while acceptable for some applications, does not provide optimum speed and field of view. Speed refers to the light gathering power of the lens. In commercial camera optics, this property of the lens system is indicated by the f/number. The exposure time required for a given photograph is proportional to the square of the f/number and will be shorter when a lens with a low f/number is used; thus, a lens having a higher speed reduces light gathering time.

Two widely spaced triplets in the form of a Petzval-type lens provide an optimum speed and field of view for the above-listed lens characteristics. A classic Petzval lens involves two spaced doublets, but the term is used here by analogy because each triplet is a net positive lens group.

The six element combination with two aspheric surfaces can be optimized on the ACCOSV optical design program. A resulting lens design shown in FIG. 1 and listed in Table 1 below.

TABLE 1

BASIC LENS DATA

| Surf. | Radius | Thickness | Medium | | Refrac. Index | Label |
|---|---|---|---|---|---|---|
| 0 | 0.00000000 | 1.50000000 E+20 | AIR | | | |
| 1 | 0.00000000 | −18.27594933 | AIR | | | |
| 2 | 7.28700000 | 0.33000000 | MATL | C_ZnS | 2.200833 | 10A |
| 3 | 4.64064000 | 0.06544000 | AIR | | | 10B |
| 4 | 5.14400000 | 0.98000000 | MATL | ZnSe | 2.406485 | 11A |
| 5 | −33.65800000 | 0.05074000 | AIR | | | 11B |
| 6 | −21.27500000 | 0.28000000 | MATL | GaAs | 3.277944 | 12A |
| 7 | 33.65800000 | 4.27000000 | AIR | | | 12B |
| 8 | 21.27500000 | 0.30000000 | MATL | C_ZnS | 2.200833 | 13A |
| 9 | 7.05700000 | 0.22000000 | AIR | | | 13B |
| 10 | 5.14400000 | 0.52500000 | MATL | ZnSe | 2.406485 | 14A |
| 11 | 0.00000000 | 0.21700000 | AIR | | | 14B |
| 12 | 2.20300000 | 0.22500000 | MATL | GaAs | 3.277944 | 15A |
| 13 | 1.90900000 | 1.01703000 | AIR | | | 15B |
| 14 | 0.00000000 | 0.08000000 | MATL | ZnSe | 2.406485 | 16A |
| 15 | 0.00000000 | 0.10000000 | MATL | | | 16B |
| 16* | 0.00000000 | 2.50000000 | AIR | | | 17 |
| 17 | 0.00000000 | 0.00000000 | AIR | | | |

CONIC CONSTANT (CC) AND ASPHERIC DATA

| Surf. | CC | AD | AB | AF | AG |
|---|---|---|---|---|---|
| 3 | 0.00000E+00 | −2.5363E−04 | −1.59381E−05 | −7.91405E−07 | −6.71513E−08 |
| 9 | 0.00000E+00 | 9.85522E−04 | 3.35206E−05 | 7.40680E−06 | −2.89437E−06 | wherein AD, AE, AF and AG represent 4th, 6th, 8th and 10th order deformation coefficients, respectively and the asterisk * signifies where the aperture stop/cold shield is located.

REFRACTIVE INDICES

| Surf. | N1 | N2 | N3 | N4 | N5 | ABBE |
|---|---|---|---|---|---|---|
| 2 | 2.200833 | 2.212892 | 2.186965 | 1.000000 | 1.000000 | 46.316416 |
| 4 | 2.406485 | 2.412209 | 2.400068 | 1.000000 | 1.000000 | 115.848590 |
| 6 | 3.277944 | 3.282937 | 3.272502 | 1.000000 | 1.000000 | 218.286360 |
| 8 | 2.200833 | 2.212892 | 2.186965 | 1.000000 | 1.000000 | 46.316416 |
| 10 | 2.406485 | 2.412209 | 2.400068 | 1.000000 | 1.000000 | 115.848590 |
| 12 | 3.277944 | 3.282937 | 3.272502 | 1.000000 | 1.000000 | 218.286360 |
| 14 | 2.406485 | 2.412209 | 2.400068 | 1.000000 | 1.000000 | 115.848590 |

These refractive indices correspond to the 8-12 micrometer range and are different for the 3-5 micrometer range when generating the spot diagrams or FIGS. 2a-2c.

WAVELENGTH DESIGNS

| Wavelength # | 1 | 2 | 3 | 4 | 5 |
|---|---|---|---|---|---|
| Wavelength | 10.00000 | 9.00000 | 11.00000 | 0.00000 | 0.00000 |
| Spectral Weight | 1.0000 | 1.0000 | 1.0000 | 1.0000 | 1.0000 |

TABLE 1-continued

OPERATING CONDITIONS

| Reference Object Height | Reference Aperture Ht. | Object Surface | Reference Surface | Image Surface |
|---|---|---|---|---|
| −0.733622E+19 (2.8000 Deg.) | 0.62393 | 0 | 16 | 17 |

APERTURE STOP AT SURFACE 16 (EN ADJUSTMENT)

| Effective Focal Length (EFL) | Back Focus | f/Number | Length | Gauss Image Height |
|---|---|---|---|---|
| 7.4911 | 2.5000 | 2.00 | 8.6602 | 0.3662 |

STANDARD AND BOOLEAN APERTURE (TM) DATA (CA ON)

| Surf. | Type | CAY | CAX | Y-OFFSET | X-OFFSET | LABEL |
|---|---|---|---|---|---|---|
| 2 | Cir. | 2.54959 | | 0.00000 | 0.00000 | 10A |
| 3 | Cir. | 2.42975 | | 0.00000 | 0.00000 | 10B |
| 4 | Cir. | 2.43030 | | 0.00000 | 0.00000 | 11A |
| 5 | Cir. | 2.36548 | | 0.00000 | 0.00000 | 11B |
| 6 | Cir. | 2.36344 | | 0.00000 | 0.00000 | 12A |
| 7 | Cir. | 2.30949 | | 0.00000 | 0.00000 | 12B |
| 8 | Cir. | 1.43501 | | 0.00000 | 0.00000 | 13A |
| 9 | Cir. | 1.38404 | | 0.00000 | 0.00000 | 13B |
| 10 | Cir. | 1.37450 | | 0.00000 | 0.00000 | 14A |
| 11 | Cir. | 1.31524 | | 0.00000 | 0.00000 | 14B |
| 12 | Cir. | 1.08791 | | 0.00000 | 0.00000 | 15A |
| 13 | Cir. | 0.97822 | | 0.00000 | 0.00000 | 15B |
| 14 | Cir. | 0.68097 | | 0.00000 | 0.00000 | 16A |
| 15 | Cir. | 0.66855 | | 0.00000 | 0.00000 | 16B |
| 17 | Cir. | 0.37445 | | 0.00000 | 0.00000 | |

Lens units are inches.
Evaluation mode is focal.
Control wavelength is 1.

Naturally, other lens characteristics can be used within the scope of the present invention. The above data is exemplary and reflects an optimum lens data for a particular quantum well detector chip.

In the preferred embodiments of the present invention, in each lens triplet, a first lens 10, 13 is negative, a second lens 11, 14 is positive, and a third lens 12, 15 is negative as taken along the chief ray. Surfaces 10B and 13B of the ZNS lens are selected for receiving aspheric surfaces. ZnS is a diamond turnable lens material which greatly eases manufacturing requirements. Also, of the manufacturing methods available for making ZnS lenses, the Cleartan™ method provides a better, more homogenous material (C_ZnS) which is clearer in the 3-5 micrometer range than produced by some other methods.

As illustrated in FIG. 1, parallel light impinging on the Petzval lens system is focused on an image plane 18. A quantum well detector 19 can be placed at the image plane 18. A cryogenic vessel or Dewar houses the quantum well detector 19 to maintain the detector 19 at a temperature of approximately 77° Kelvin in order to increase detector sensitivity. The cold shield 20 of the Dewar is shown.

In these types of systems, optimum performance is achieved by cold shielding the detector array. This is done by introducing a cold diaphragm, or cold shield 20, with an aperture stop 17 in front of the detector array so that the viewing angle of the detector to the warm background is limited as nearly as possible to only that required for transmission of radiation from the scene. Since the amount of radiation reaching the detector from the cold shield 20 is negligible compared to the amount reaching the detector from the warm background of the field of view, induced noise in the detector is minimized. The cold shield 20 is typically placed within the Dewar. Also included in the optical system may be a Dewar window 16.

The performance achieved in each spectral band is shown by the spot diagrams in FIGS. 2a-2c and 3a-3c. Rays representative of three wavelengths in each of the 3 to 5 and 8 to 12 spectral bands from an on-axis and two off-axis field points are distributed through the full aperture and are traced through the system, producing FIGS. 2c, 2a and 2b, respectively. In FIG. 2a, the FOB-Y is 1.0000 and the FOB-X is 0.0000; in FIG. 2b, the FOB-Y is 0.7000 and the FOB-X is 0.0000; in FIG. 2c, the FOB-Y is 0.0000 and the FOB-X is 0.0000; in FIG. 3a, the FOB-Y is 1.0000 and the FOB-X is 0.0000; in FIG. 3b, the FOB-Y is 0.7071 and the FOB-X is 0.0000; and in FIG. 3c, the FOB-Y is 0.0000 and the FOB-X is 0.0000, wherein FOB stands for fractional object height. FOB refers to the object point (or field angle when the object is at infinity) from which rays are traced.

As shown in FIGS. 2a-2c and 3a-3c, the square in phantom is the pixel size of a typical quantum well detector, e.g., 50.8×50.8 micrometers (0.002 inches). In FIGS. 2a-2c and 3a-3c, all spot diagram origins are on the chief ray. Since virtually all of the ray intercepts are contained within the pixel, the image resolution will be limited by such a detector.

By the above disclosed imaging system, the optimum capability of a quantum well detector can be utilized. A quantum well detector's capability could go under-utilized without an optical system such as disclosed herein that can simultaneously deliver the image quality required over both the 3 to 5 μm and 8 to 5 μm spectral bands. The lens system in accordance with the present invention yields excellent broad-band color correction by a combination of infrared lens material suitable for tactical applications.

Certain preferred embodiments of the invention have been described by way of example. Various other embodiments and components thereof will be apparent, particularly in applying the lens triplets to perform various functions. Various parameters may be optimized for different purposes. For example, a beam splitter may be introduced into the lens system to split an image into the 3-5 μm range and the 8-12 μm range, whereupon the lens powers may vary and color correction requirements loosened because of the using more than one focal plane. The lens system can be useful with detectors capable of imaging either the 3 to 5 μm or 8 to 12 μm spectral bands, and an imaging system can be envisioned wherein high and low spectral band detectors can be selectively placed at the focal plane(s), by use of a beam splitter or employing a detector change-over mechanism. Naturally, optimum performance is achieved when employing a single detector capable of detecting both the 3 to 5 μm and 8 μm to 12 μm spectral bands. The foregoing description is offered as illustrative and not limitative. Other variations and equivalents thereof are intended to be encompassed by the invention, which is defined by the claims appended hereto.

I claim:

1. An optical lens system simultaneously focusing light in both the 3-5 and 8-12 microwave spectral bands onto a single focal plane, comprising:
   a first, negative zinc sulfide lens,
   a second, positive zinc selenide lens, and
   a third, negative gallium arsenide lens,
   each of said first through third lenses being positioned along a chief ray and capable of simultaneous dual band imagery in both the 3-5 and 8-12 micrometer spectral bands.

2. An optical lens system according to claim 1, further comprising:
   a fourth, negative zinc sulfide lens,
   a fifth, positive zinc selenide lens,
   a sixth, negative gallium arsenide lens,
   each of said first through sixth lenses being positioned along a chief ray, said first through third and said fourth through sixth lenses forming two spaced triplets.

3. An optical lens system according to claim 2, wherein said two spaced triplets form a Petzval-type lens.

4. An optical lens system according to claim 2, further comprising a field flattener lens, and a diaphragm.

5. An optical lens system according to claim 1, wherein at least one of said lenses has an aspheric surface.

6. An optical lens system according to claim 2, wherein a surface on said second zinc selenide lens is aspheric.

7. An optical lens system according to claim 2, wherein a surface on said fifth zinc selenide lens is aspheric.

8. An optical lens system according to claim 2, wherein said lens system has the following basic lens data:

| BASIC LENS DATA | | | | | |
|---|---|---|---|---|---|
| Surf. | Radius | Thickness | Medium | | Refrac. Index |
| 0 | 0.00000000 | 1.50000000 E+20 | AIR | | |
| 1 | 0.00000000 | −18.27594933 | AIR | | |
| 2 | 7.28700000 | 0.33000000 | MATL | C ZnS | 2.200833 |
| 3 | 4.64064000 | 0.06544000 | AIR | | |
| 4 | 5.14400000 | 0.98000000 | MATL | ZnSe | 2.406485 |

| -continued | | | | | |
|---|---|---|---|---|---|
| BASIC LENS DATA | | | | | |
| Surf. | Radius | Thickness | Medium | | Refrac. Index |
| 5 | −33.65800000 | 0.05074000 | AIR | | |
| 6 | −21.27500000 | 0.28000000 | MATL | GaAs | 3.277944 |
| 7 | 33.65800000 | 4.27000000 | AIR | | |
| 8 | 21.27500000 | 0.30000000 | MATL | C ZnS | 2.200833 |
| 9 | 7.05700000 | 0.22000000 | AIR | | |
| 10 | 5.14400000 | 0.52500000 | MATL | ZnSe | 2.406485 |
| 11 | 0.00000000 | 0.21700000 | AIR | | |
| 12 | 2.20300000 | 0.22500000 | MATL | GaAs | 3.277944 |
| 13 | 1.90900000 | 1.01703000 | AIR | | |
| 14 | 0.00000000 | 0.08000000 | MATL | ZnSe | 2.406485 |
| 15 | 0.00000000 | 0.10000000 | MATL | | |
| 16 | 0.00000000 | 2.50000000 | AIR | | |
| 17 | 0.00000000 | 0.00000000 | AIR. | | |

9. An optical detection system comprising:
   a lens system simultaneously focusing light in both the 3-5 and 8-12 microwave spectral bands onto a single focal plane, wherein said lens system includes:
      a first, negative zinc sulfide lens,
      a second, positive zinc selenide lens, and
      a third, negative gallium arsenide lens,
   each of said first through third lenses being positioned along a chief ray and capable of simultaneous dual band imagery in both the 3-5 and 8-12 micrometer spectral bands; and
   a detector located at said single focal plane.

10. An optical detection system according to claim 9, wherein said lens system further includes:
    a fourth, negative zinc sulfide lens,
    a fifth, positive zinc selenide lens,
    a sixth, negative gallium arsenide lens,
    each of said first through sixth lenses being positioned along a chief ray, said first through third and said fourth through sixth lenses forming two spaced triplets.

11. An optical detection system according to claim 10, wherein said two spaced triplets form a Petzval-type lens.

12. An optical detection system according to claim 9, further comprising a field flattener lens, and a diaphragm.

13. An optical detection system according to claim 9, wherein at least one of said lenses has an aspheric surface.

14. An optical detection system according to claim 9, wherein a surface on said second zinc selenide lens is aspheric.

15. An optical detection system according to claim 10, wherein a surface on said fifth zinc selenide lens is aspheric.

16. An optical detection system according to claim 10, wherein said lens system has the following basic lens data:

| BASIC LENS DATA | | | | | |
|---|---|---|---|---|---|
| Surf. | Radius | Thickness | Medium | | Refrac. Index |
| 0 | 0.00000000 | 1.50000000 E+20 | AIR | | |
| 1 | 0.00000000 | −18.27594933 | AIR | | |
| 2 | 7.28700000 | 0.33000000 | MATL | C ZnS | 2.200833 |
| 3 | 4.64064000 | 0.06544000 | AIR | | |
| 4 | 5.14400000 | 0.98000000 | MATL | ZnSe | 2.406485 |
| 5 | −33.65800000 | 0.05074000 | AIR | | |
| 6 | −21.27500000 | 0.28000000 | MATL | GaAs | 3.277944 |
| 7 | 33.65800000 | 4.27000000 | AIR | | |

-continued

BASIC LENS DATA

| Surf. | Radius | Thickness | Medium | | Refrac. Index |
|---|---|---|---|---|---|
| 8 | 21.27500000 | 0.30000000 | MATL | C ZnS | 2.200833 |
| 9 | 7.05700000 | 0.22000000 | AIR | | |
| 10 | 5.14400000 | 0.52500000 | MATL | ZnSe | 2.406485 |
| 11 | 0.00000000 | 0.21700000 | AIR | | |
| 12 | 2.20300000 | 0.22500000 | MATL | GaAs | 3.277944 |
| 13 | 1.90900000 | 1.01703000 | AIR | | |
| 14 | 0.00000000 | 0.08000000 | MATL | ZnSe | 2.406485 |

-continued

BASIC LENS DATA

| Surf. | Radius | Thickness | Medium | Refrac. Index |
|---|---|---|---|---|
| 15 | 0.00000000 | 0.10000000 | MATL | |
| 16 | 0.00000000 | 2.50000000 | AIR | |
| 17 | 0.00000000 | 0.00000000 | AIR. | |

* * * * *